`United States Patent` [19]

Brouwer

[11] 4,018,287

[45] Apr. 19, 1977

[54] SOD CUTTING KNIFE WITH SEPARATE SIDE BLADES

[75] Inventor: Gerardus J. Brouwer, Keswick, Canada

[73] Assignee: Brouwer Turf Equipment Limited, Keswick, Canada

[22] Filed: Mar. 3, 1975

[21] Appl. No.: 554,812

[30] Foreign Application Priority Data

Oct. 4, 1974 Canada ............................. 210798

[52] U.S. Cl. .................................. 172/19; 172/704
[51] Int. Cl.² ........................................ A01B 45/04
[58] Field of Search ............... 172/19, 20, 44, 101, 172/155, 159, 190, 191, 192, 201, 376, 377, 694, 698, 719, 720, 752, 753, 704

[56] References Cited

UNITED STATES PATENTS

| 1,384,631 | 7/1921 | Parschauer | 172/44 |
| 1,527,599 | 2/1925 | Martin | 172/698 |
| 1,595,112 | 8/1926 | Mentzer | 172/753 |
| 2,897,901 | 8/1959 | Grube et al. | 172/20 |
| 3,540,535 | 11/1970 | Brouwer et al. | 172/20 |
| 3,812,918 | 5/1974 | Beck | 172/19 |

Primary Examiner—Richard T. Stouffer
Attorney, Agent, or Firm—Rogers, Bereskin & Parr

[57] ABSTRACT

A sod cutting knife having a horizontal undercutting blade, vertical support arms connected to each side of the undercutting blade, and removable side cutting blades mounted at the front of each support arm. The side cutting blades project below the bottom of the undercutting blade to protect the connection between the undercutting blade and the support arms against wear. The vertical and horizontal extent of the protrusions of the side cutting blades below the undercutting blade is limited to avoid undue resistance to vertical movement of the knife into the ground.

7 Claims, 12 Drawing Figures

SOD CUTTING KNIFE WITH SEPARATE SIDE BLADES

This invention relates to an improved knife for use with a sod cutting machine.

In sod cutting machines such as the harvester shown in U.S. Pat. No. 3,509,944 issued May 5, 1970, to G. J. Brouwer, there is usually provided a knife having an undercutting blade to sever beneath the strip of sod to be cut, and two side cutting blades, one attached to each edge of the undercutting blade, to sever the edges of the strip of sod. Such a knife is also shown in Canadian Pat. No. 641,787 issued May 29, 1962 to Sod-Master Corporation.

A disadvantage of the knife shown in the said Canadian patent is that as it is reciprocated during use, the side cutting blades tend to wear away rapidly. As the side cutting blades wear, their connection with the undercutting blade also wears. Once substantial wear of this kind occurs, the knife cannot be re-sharpened and must be thrown away. Since during active sod harvesting, knives may wear out at the rate of one every day or two, and since the knives are expensive, the cost of knife replacement has become unduly high.

Accordingly, it is an object of the present invention to provide a more economical knife for a sod harvester. This is accomplished by providing a knife of the kind shown in the above Canadian patent, but with the side cutting blades (which are subjected to the most wear) being removable, and with excess material provided at the lower rear edges of the side cutting blades, so that the undercutting blade and its connection with the side support members of the blade are protected.

Further objects and advantages of the invention will appear from the following description, taken together with the accompanying drawings, in which.

Figure 1:
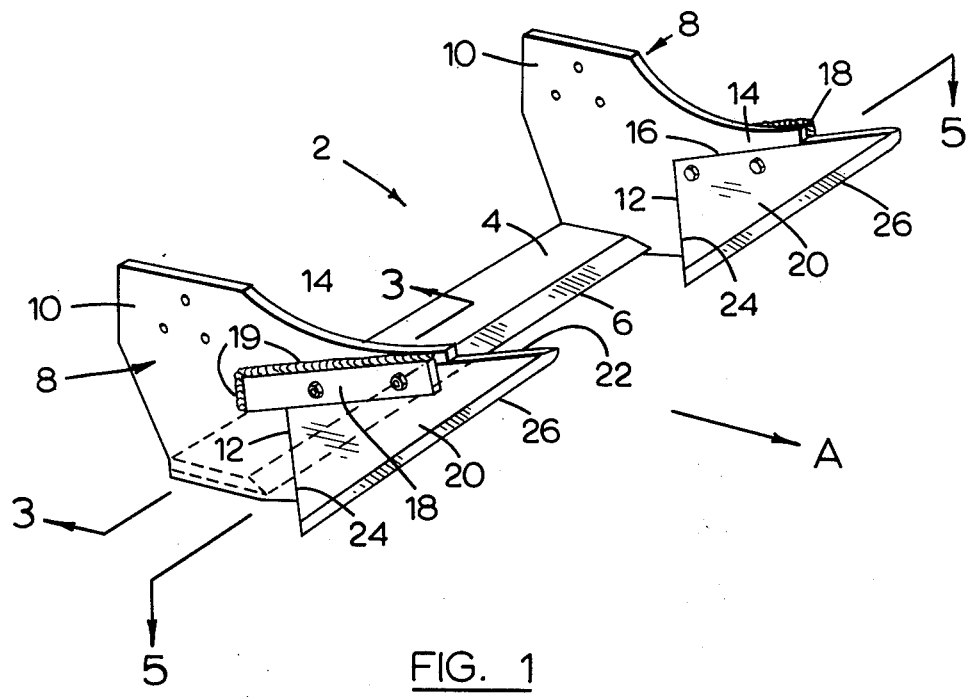
FIG. 1 is a perspective view of a sod cutting knife according to the invention.

The sod cutting knife of the invention is shown at 2 in the drawings and includes an elongated undercutting blade 4 having a sharpened forward edge 6. As the knife 2 is moved forwardly along a path of travel indicated by Arrow A as part of a sod cutter or harvester (not shown), the undercutting blade 4 severs beneath a strip of sod (not shown). Located at each end of the undercutting blade 4 is a generally vertical side support arm 8. Each side support arm 8 includes a rear portion 10 which extends upwardly and to some extent rearwardly from the undercutting blade 4. Each rear portion 10 includes a front edge 12.

Each side support arm also includes a front projection 14 extending upwardly and forwardly from the upper part of the front edge 12. The projections 14 each have a lower edge 16, and a flange 18 located outwardly of and extending downwardly from the lower edge 16. Typically each side support arm 8 is formed from flat metal plate stock, the flanges 18 also being formed from the plate stock and being welded to the side support members as indicated at 19.

The cutting knife 2 also includes a pair of side cutting blades 20. Each side cutting blade 20, when new, has the form of a right angle triangle, having a linear upper edge 22, a linear rear edge 24, and a linear lower cutting edge 26 which slopes upwardly from rear to front so that it may sever the edges of the sod strip being cut. The side cutting blades 20 are typically formed from plate material having the same thickness as the side support arms 8.

Figure 3:
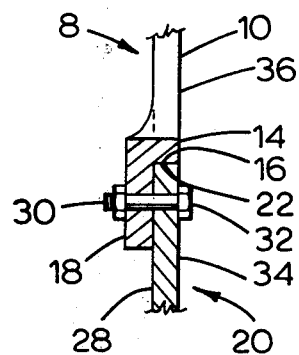
FIG. 3 is a sectional view of a portion of the cutting knife of FIG. 1, taken along lines 3—3 of FIG. 1.

The side cutting blades 20 are secured to the side support arms 8 as follows. The upper edge 22 of each side cutting blade abuts against the lower edge 16 of its associated fron projection 14 (FIG. 3); the rear edge 24 of each side cutting blade abuts against the front edge 12 of its associated side support arm 8 (FIG. 1), and the outside surface 28 (FIG. 3) of each side cutting blade 20 the side support members. The flat inner surface 34 (FIG. 3) of each side cutting blade 20 is aligned with the flat inner surface 36 of each side support arm 8.

Figure 2:
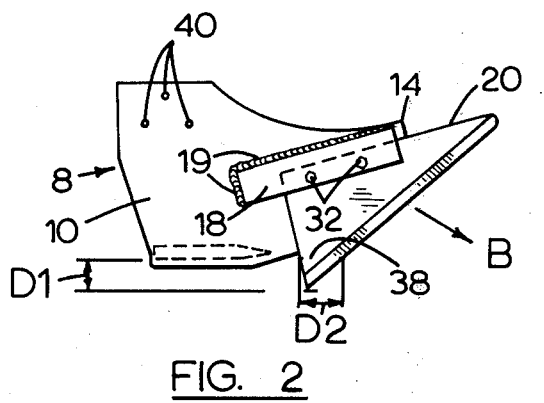
FIG. 2 is a side view of the cutting knife of FIG. 1.

It will be noted that the rear part of each side cutting blade 20 projects downwardly substantially below the bottom of the undercutting blade 4. These downward protrusions are indicated at 38 (FIG. 2). The distance D1 (FIG. 2) by which the rear portion of each side cutting blade 20 projects below the bottom of the undercutting blade 4 is typically between one-quarter and three-quarters of an inch.

In use, the cutting knife 2 is secured to carrying and driving arms (not shown) conventionally provided in a sod harvesting machine for supporting and reciprocating the knife 2. Holes 20 are provided in the upper portions of the side support arms 8 for this purpose. As the knife 2 is reciprocated, cut sod travels over the undercutting blade 4 and may be rolled up by a following conveyor (not shown) if desired. Since the inner surfaces 34 of the side cutting blades 20 and the inner surfaces 36 of the side support arms 10 are planar and are aligned, minimum interference is presented to the passage of the sod. In addition, the vertical spacing between the bolts 30 and the undercutting blade 4 is greater than the normal thickness of the sod to be cut, so that the heads of bolts 32 will not interfere with the passage of the sod.

The protrusions 38 of the side cutting blades below the bottom of the side support arms and the undercutting blade protect these members against wear. The excess material represented by the protrusions 33 must wear away upwardly to the level of the bottom of the undercutting blade 4 before serious damage can begin to occur to the connection between the undercutting blade 4 and the side support arms 10. This wear normally requires a substantial period of time, thereby lengthening the life of the knife.

It will be seen that the side support arms 8 also project slightly below the bottom of the undercutting blade 4. This arrangement provides further protection for the connection of the side support arms 8 to the undercutting blade 4 and also allows room for a weld between the two. However, this projection should not be too great or it will create too much resistance to downward movement of the cutting knife 2 (in the direction of arrow B FIG. 2) into the earth as the knife is reciprocated. Such interference reduces the quality of the cut sod. It will also be noted that the front to rear length D2 of the portion of the side cutting blades located below the level of the undercutting blade (i.e. of the protrusions 38) is relatively short, typically between 1 and 3 inches, and is sharpened. This ensures that the protrusions 38 do not impose undue resistance to the downward movement of the knife during operation.

Normally the undercutting blade 4 will be made of hard good wearing steel while the side cutting blades 20, which are subject to the higher wear (particularly at their protrusions 38) are made of the same material but may be subjected to an additional heat hardening treatment.

Figure 4:
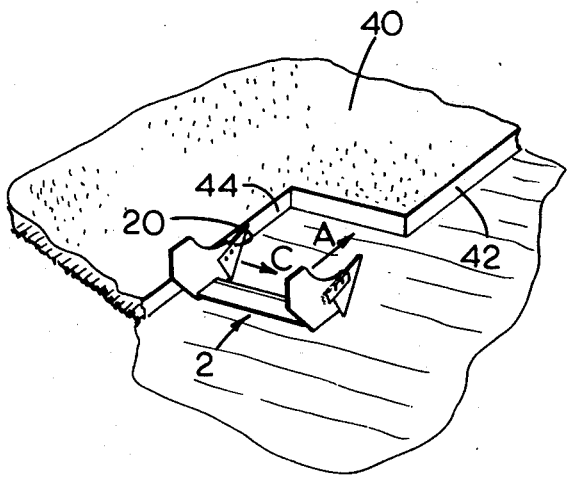
FIG. 4 is a diagrammatic view showing the orientation of the cutting knife of FIG. 1 relative to sod to be cut.

It will be appreciated that the cutting knife 2 can be used either in a sod cutting machine (which simply cuts the sod) or in a sod harvesting machine (in which the sod is cut, picked up, and folded or rolled). When the knife is used in a sod harvesting machine where the sod is picked up, the situation shown in FIG. 4 may occur. In FIG. 4 a field of sod to be cut is indicated at 40; the cut edge of the sod created by a previous pass of a harvester employing the knife 2 is indicated at 42, and the cut edge being created by the current pass of the harvester is indicated at 44. The cutting knife is indicated diagrammatically at 2 as moving along its path.

Figure 5:
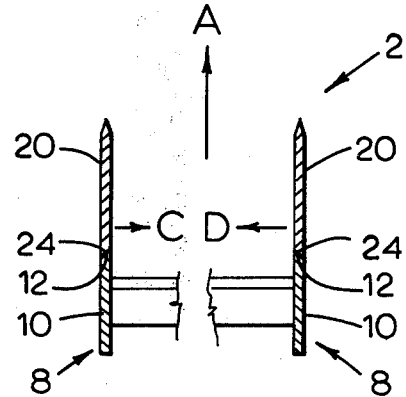
FIG. 5 is a sectional elevation taken along lines 5—5 of FIG. 1.

As the cutting knife 2 is carried along in the direction of arrow A, the edge 44 of the uncut sod tends to press the side cutting blade 20 closest to it sideways in the direction of arrow C. To resist this tendency, the rear edges 24 of the side cutting blades and the forward edges 12 of the side support arms 8 may be bevelled as shown in FIG. 5 (instead of having the more usual square configuration). The bevelling, which causes the side cutting blades 20 to have a longer outer surface and a shorter inner surface, and the rear portions of the side support arms to have a shorter outer surface and a longer inner surface, resists forces which tend to push the side cutting blades inwardly in the direction of the arrow C for the left hand side cutting blade 20 and in the direction of arrow D for the right hand side cutting blade 20. It will be appreciated that forces tending to push the side cutting blades 20 outwardly are resisted by the flanges 18.

Figure 6:
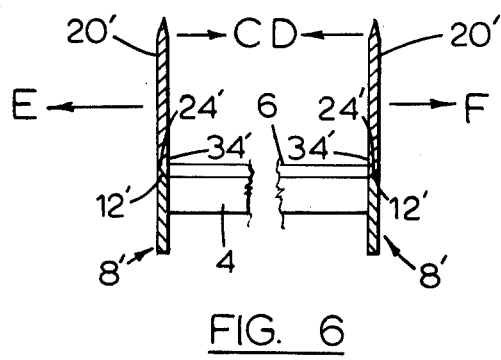
FIG. 6 is a view similar to that of FIG. 5 but showing a modification of the cutting knife of FIG. 1.
Figure 7:
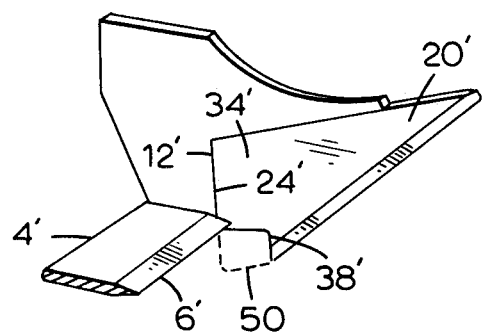
FIG. 7 is a perspective view of a portion of the cutting knife of FIG. 6.

In areas where there are stones in the soil or where the soil is unusually lumpy, the side cutting blades 20 are subjected to forces tending to force them sideways in both directions. To resist these forces, the cutting knife may be modified as shown in FIGS. 6 and 7, where primed reference numerals indicate parts corresponding to those of FIGS. 1–5. In FIGS. 6 and 7, the rear edges 24' of the side cutting blade and the forward edges 12' of the side support arms 8' are bevelled to resist forces tending to push the side cutting blades outwardly in the direction of arrows E and F. In addition, the rear edges of the side cutting blades are extended rearwardly as shown so that the rear portions of the inner surfaces 34' of the side cutting blades lie against the side edges of the front part of the undercutting blade 4'. This abutment resists forces tending to push the side cutting blades in the direction of arrows C and D (FIG. 6).

As best shown in FIG. 7, it will be seen that the protrusions 38' of the side cutting blades below the undercutting blade do not extend as far back as the leading edge 6' of the undercutting blade 4'. Although the protrusions 38' could be extended rearwardly as shown by the dotted line 50, this would create substantial resistance to downward movement of the cutting knife 2 into the earth and would normally be undesirable.

Instead of extending the side cutting blades rearwardly as shown in FIGS. 6 and 7, the undercutting blade 4 could be moved forwardly until its leading edge is positioned slightly ahead of the rear edges 24 of the cutting blades. This would prevent inward displacement of the side cutting blades. However, this would reduce the extent of the side cutting blade positioned ahead of the undercutting blade, i.e. there would be less material ahead of the edges of the undercutting blade to wear before the side edges of the undercutting blade become exposed and subject to wear, and therefore the arrangement shown in FIGS. 6 and 7 is preferred.

Figure 8:
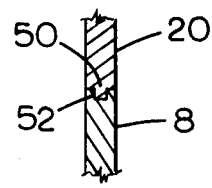
FIG. 8 is a sectional view, taken from above, showing an alternative connection between the rear edge of a side cutting blade and the leading edge of a side support arm.
Figure 9:
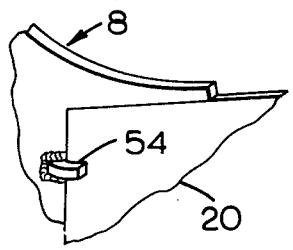
FIG. 9 is a perspective view showing a portion of a further modification of the cutting knife of FIG. 1.

If desired, sideway displacement of the side cutting blades can be prevented by a simple tongue and groove arrangement for the connection between the rear edges 24 of the side cutting blades and the leading edges 12 of the side support arms 10. FIG. 8 shows such an arrangement, the tongue being indicated at 50 and the groove at 52. However, a tongue and groove is difficult to fabricate in a relatively thin blade and is not preferred. Another alternative is to provide tabs such as that indicated at 54 in FIG. 9, the tabs being welded to the side support arms at a level above the thickness of the sod to be cut and extending forwardly of the rear edges 24 of the side cutting blades (on one or both sides of the side cutting blade).

Figure 10:
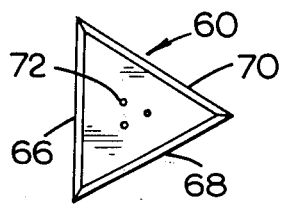
FIG. 10 is a side view of a modified side cutting blade according to the invention.
Figure 11:
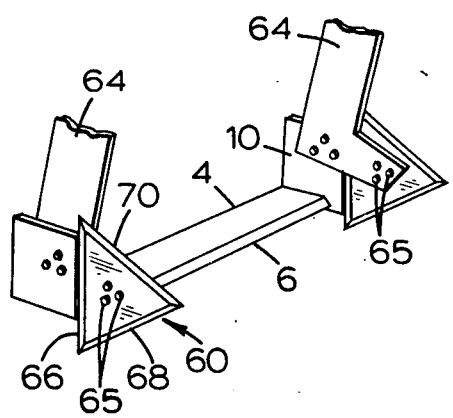
FIG. 11 is a perspective view of the side cutting blade of FIG. 10 mounted to an undercutting blade.

A further embodiment of the invention is shown in FIGS. 10 and 11. In FIGS. 10 and 11 the side cutting blades 60 are not mounted directly on the side support arms 10 but instead are mounted on extensions 62 which project forwardly from the blade mounting arms 64 of the sod cutting machine (not shown). Each side cutting blade 60 may be spaced slightly forwardly of the side support arms 10, or it may have its rear edge 66 abutting against the forward edge 12 of the side support arms 10. The blades 60 are held in place on the mounting arm extensions 62 by nuts and bolts 65.

In the embodiment shown in FIGS. 10 and 11, the side cutting blades 60 have been made reversible. For this purpose, each side cutting blade 60 is formed in the shape of an equalateral triangle and all three of its edges 66, 68, 70 are sharpened. Each blade 60 is provided with three mounting holes 72 also arranged in the form of an equalateral triangle having its sides parallel to and equally spaced from the sides of the triangle constituted by blade 60. The mounting holes 72 are of course spaced interiorly of the sharpened edges of the blade 60. The mounting arm extensions 62 are provided with matching holes also arranged in an equalateral triangle, to support blades 60 in operative position with any one of the cutting edges 66, 68, 70 slanting upwardly from rear to front.

It will be seen that in the FIGS. 10 and 11 embodiment, the blades 60 may be turned so that any of their three edges 66, 68, 70 forms the front cutting edge. This extends the useful life of the blades 60. Since the blades 60 lie against and are supported by the sturdy mounting arm extensions 62, any tendancy of the blades 60 to move sideways out of alignment with the side support arms 10 of the undercutting blade is minimized. At the same time, fabrication of the undercutting blade 4 is simplified, since it now has a simple U-shape. The location of the blades 60 just ahead of the side support arms 10, and the fact that the blades 60 are preferably at least as thick as the side support arms 10, minimizes resistance to movement of the side support arms through the sod and helps to prevent ragged edges on the sod.

In the FIGS. 10 and 11 embodiment, each blade 60 is preferably again made of size such that the lower corner of its trailing edge extends below the undercutting blade 4 by between one quarter and three quarters of an inch. This arrangement substantially lengthens the life of the undercutting blade. The dimensions of the side cutting blade are preferably such that the front to rear length of this protrusion below the bottom of the undercutting blade 4 preferably does not exceed two or three inches.

Figure 12:
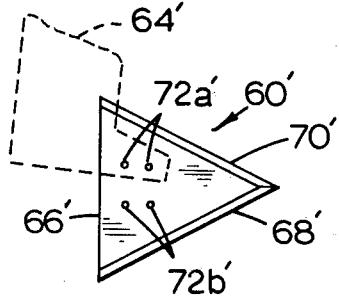
FIG. 12 is a side view of a further modified side cutting blade according to the invention.

If it is desired to have a flat rear edge on the side cutting blade, so that it can abut firmly against the side support arm 10 behind it (and if desired, interlock with such side support arm), then the side cutting blades may be shaped as isoceles triangles, as shown at 60' in FIG. 12 (in which primed reference numerals indicate parts corresponding to those of FIGS. 10 and 11). In the FIG. 12 blade, the rear edge 66' is flat and unsharpened, so that it may abut against the leading edge 12 of the side support arm behind it, and two separate sets of mounting holes 72a', 72b' are provided, for use depending on which edge of blade 62' is used for cutting.

What I claim is:

1. Sod cutting means adapted to be advanced forwardly along a path of travel to sever a strip of sod and comprising:
    a. an elongated undercutting blade;
    b. a pair of side support arms, one connected to each side of said undercutting blade and each extending upwardly from said undercutting blade, said side support arms having flat inner opposed surfaces oriented parallel to said path of travel, each side support arm having a rear portion having a forward edge, and a forward projection extending forwardly from the upper part of said forward edge and located substantially above said undercutting blade, said projection having a lower edge;
    c. a pair of side cutting blades, each side cutting blade having a top edge, a rear edge, and a lower cutting edge slanting upwardly from rear to front, each side cutting blade having a substantially flat inner surface;
    d. means detachably mounting said side cutting blades in fixed relation to said undercutting blade with the rear of each said lower cutting edge being located forwardly of said undercutting blade and with said inner surface of each side cutting blade being aligned with said inner surface of its associated side support arm;
    e. said top edge of each side cutting blade abutting against said lower edge of its associated projection and said rear edge of each side cutting blade abutting against said forward edge of the rear portion of its associated side support arm;
    f. said lower edges of said side cutting blades extending, at the rear of said lower edges, substantially below said undercutting blade to protect the connection between said undercutting blade and said side support arms.

2. Sod cutting means according to claim 1 wherein said side cutting blades are of harder material than that of said undercutting blade.

3. Sod cutting means according to claim 1 wherein each forward projection includes a flange extending outwardly and below its said lower edge, said flange having an inside surface, the upper parts of said side cutting blades resting against said flanges, said knife including bolts extending through said flanges and through the upper parts of said side cutting blades to secure said side cutting blades to said flanges.

4. Sod cutting means according to claim 1 wherein said rear edges of said side cutting blades and said forward edges of said side support arms are both bevelled so that said side cutting blades extend further rearwardly at their inner than at their outer surfaces, and said side support arms extend further forwardly at their outer than at their inner surfaces, whereby to resist forces tending to push said side cutting blades outwardly, said side cutting blades having portions lying against the side edges of said undercutting blade, whereby to resist forces tending to push said side cutting blades inwardly.

5. Sod cutting means according to claim 1 wherein said side cutting blades have substantially the shape of a right angled triangle, said rear edges of said side cutting blades slanting rearwardly from bottom to top, said top edges of said side cutting blades slanting upwardly from rear to front.

6. Sod cutting means according to claim 1 wherein the extent of the projection of said side cutting blades below said undercutting blade is between one-quarter and three-quarters of an inch, and the dimension, in a direction parallel to said path of travel, of that portion of said side cutting blades located below said undercutting blade is between one and three inches.

7. The invention according to claim 1 wherein the extent of the projection of said side cutting blades below said undercutting blade is between one-quarter and three-quarters of an inch, and the dimension, in a direction parallel to said path of travel, of that portion of said side cutting blades located below said undercutting blade is between one and three inches.

* * * * *